Aug. 14, 1945. F. SZALAY 2,382,751
CURRENT COLLECTOR FOR ELECTRIC VEHICLES
Filed Aug. 21, 1941
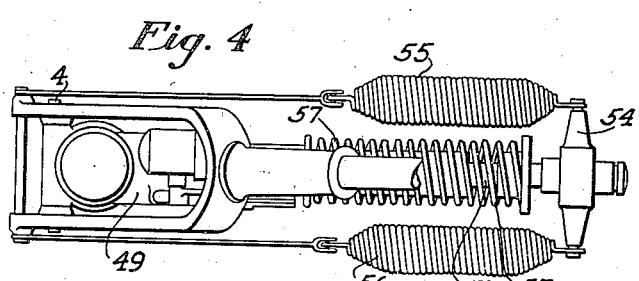
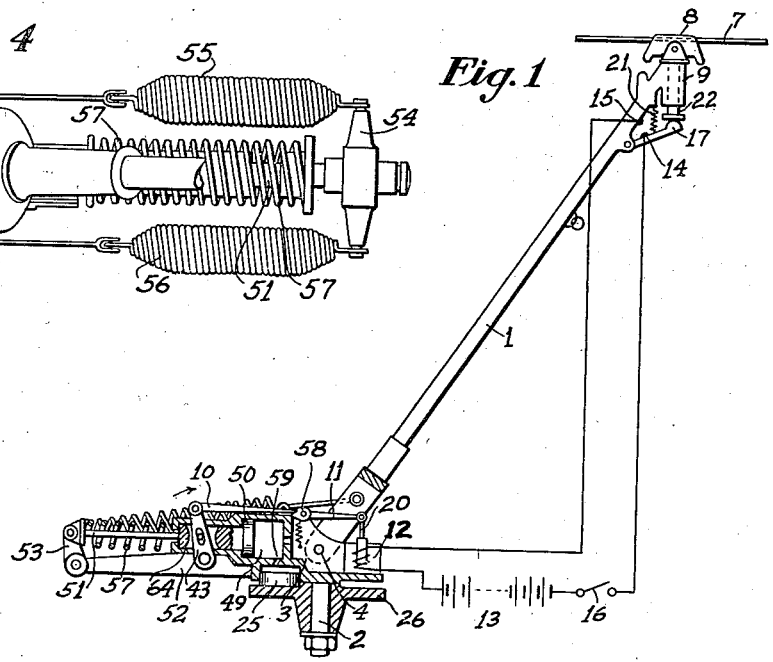
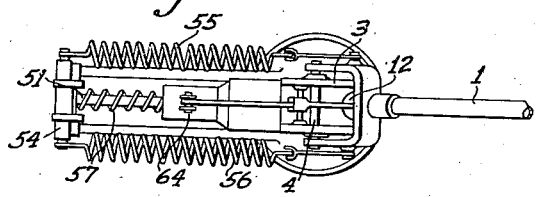
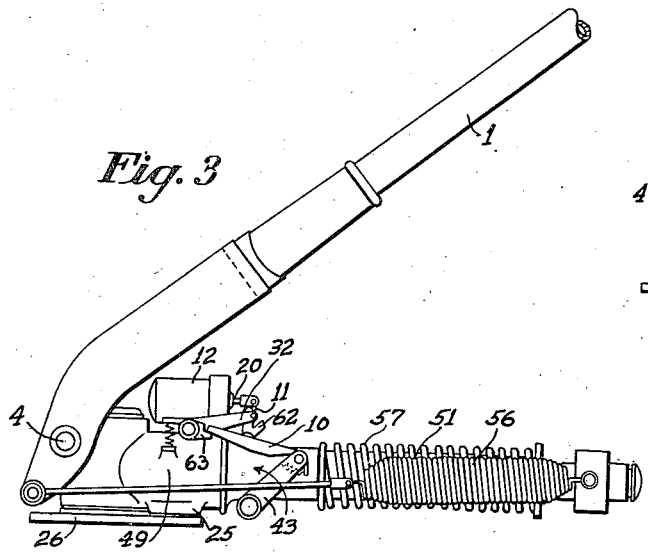
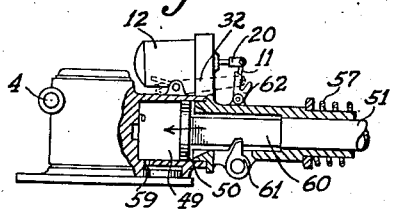
Inventor
FERENC SZALAY Patented Aug. 14, 1945

2,382,751

UNITED STATES PATENT OFFICE 2,382,751

CURRENT COLLECTOR FOR ELECTRIC VEHICLES

Ferenc Szalay, Budapest, Hungary; vested in the Alien Property Custodian

Application August 21, 1941, Serial No. 407,804
In Hungary August 23, 1940

4 Claims. (Cl. 191—85)

The sliding shoes or trolleys of the current collectors of the known types are liable to dewirement (to jump off the overhead wires) whilst running, in which case the spring urging the current collector against the overhead wires raises the current collector around the horizontal axis. This will cause the upper end of the current-collector pole to project above the overhead wire, in consequence whereof the trolley pole will seriously damage any overhead wires getting into its way as well as any suspension wires of the overhead net. A further drawback is that the pole of the current collector which has dewired will swing out freely around the vertical axis of the trolley base and will perform a mowing-like motion, thus damaging any such wires or other objects as may be situated sideways from the overhead wires. Any damage thus produced can only be corrected by means of lengthy and expensive repairs, whilst, high-tension wires crashing down also may cause a danger to life.

In order to eliminate the drawbacks enumerated, a device is provided on the current collector according to the invention wherein the trolley pole is propped in its working position, by a device operated by an electric and/or mechanical apparatus and wherein a pivot is provided on the trolley pole or on its support around which said pole will, as soon as the propping device is released, snap down to a level lower than that of the overhead wires.

In the preferred embodiment of the invention, the lifting spring or springs of the current collector urging the trolley pole against the overhead wires are released by means of an oil or air dashpot and/or of a counter-spring, the operation of which is effected by means of an electromagnet and/or an electric motor and/or compressed air.

The re-setting of the released mechanism is effected by lifting the trolley pole above its highest working position, during which procedure the counterspring or some other pressure force overcomes the force of the lifting spring and pulls the pole into working position.

In addition, it is the pressure of the oil- or air-dashpot that is utilized also for braking the rotation of the trolley pole around a vertical axis, so as to prevent any damage which might be caused by the lateral movements of the trolley pole i. e., by the mowing-like motion.

The invention will now be described by way of examples with reference to the accompanying drawing, in which:

Fig. 1 is a side elevation, and partly a section of a preferred embodiment of the current collector according to the invention.

Fig. 2 is a plan view of the device according to Fig. 1.

Fig. 3 is a side elevation of a modification of the current collector according to Fig. 1.

Fig. 4 is a plan view of the device shown in Fig. 3.

Fig. 5 illustrates a detail of Fig. 3 in section.

In the preferred embodiment according to Figs. 1 and 2, a dashpot 49 extends sideways from the frame 3. The rod 51 of the piston 50 moving in this dashpot is articulately connected to the arms 53 journalled at the end of the arm 52 projecting from the frame 3. The arms 53 carry the journals for the transverse pivot 54 (Fig. 2). One end of each of the lifting springs 55 and 56, respectively, is fastened to the two ends of this pivot, whilst the other ends of the said springs are attached to the forked end of the trolley pole 1 in the vicinity of the pivot 4. The piston rod 51 is surrounded by the counterspring 57, which acts, on the one hand, on the pivot 54, and on the other hand, on the casing of the dashpot 49. In the working positions of the trolley pole, the action of the counterspring is weaker than the resultant of the springs 55, 56; notably, it may amount to, say, between one-tenth and five-tenths of the latter.

The working point of the lifting springs 55, 56 on the trolley pole 1 is determined by the overhead wire pressure, from the pivot 4 of the pole, and accordingly, when the trolley pole approaches the vertical position, the strength of the springs diminishes. Accordingly, it will be possible to provide for the counter-spring 57 to overcome the lifting force of the springs 55, 56 in the highest working position of the trolley pole, in order to render the release of the lifting spring by means of pivot 54 and of piston rod 51 possible.

The lever 43 journalled on the base 3 passes through the port 64 cut into the thicker part of the piston rod 51. The lever 10 connected articulately to the upper end of the lever 43 catches into the rest of the pawl 11 pivotable around the pivot 58, on the opposite end of which pawl the armature 20 of the electro-magnet 12 attaches. The operation of the electro-magnet 12 is effected as follows:

The pole 1 is provided with the conventional sliding shoe 8 which is rotatable around a vertical axis in the sleeve 9 carried by the pole 1. The magnet 12 is connected to a source of current 13 through a switch 16 and normally open contacts 14 and 15. Contact 15 is mounted on the pole 1, but insulated therefrom, and contact 14 is carried by and insulated from an arm 17 pivoted to pole 1, the contact 14 being urged towards the contact 15 by the spring 21 which forces the arm 17 into engagement with the lower end of the pivot 22 for the sliding shoe 8. As the switch 16 is normally maintained closed, it is apparent that when the trolley pole 1 leaves the wire 7, the spring 21 raises the pivot 22 and permits contact to be made between contacts 14 and 15 thereby causing energization of the electro-magnet 12.

The trolley pole snaps down in the following manner:

If the sliding shoe or trolley leaves the overhead wire, the electro-magnet 12 will draw-in its armature 20, which latter pulls down and/or strikes the longer arm of the pawl 11, whilst the shorter arm of the pawl 11 thrusts the lever 10 from its rest.

The release of the lever 10 releases the propping lever 43, whereupon the lifting springs 55, 56 thrust the piston rod 51, and, together with it, the piston 50 and the pivot 54 towards the axis 4, i. e. towards the right. After this motion has been braked by the counter-spring 57 and by the dashpot 49, it is only gradually that the lifting springs 55, 56 will become released, and thus the trolley pole 1 will not drop freely, but will first sink rapidly below the level of the contact wire and then with gradual deceleration to its horizontal position.

The mowing-like motion of the trolley pole which has jumped off the overhead wire is prevented by the brake piston 25 moving in the cavity of base 3 fitted with pivot 2. Whilst piston 50 compresses the medium contained in dashpot 49, the air gets through the aperture 59 into the space behind the brake piston 25, and presses the latter against the base-plate 26.

If the trolley pole which has jumped off is to be replaced on the overhead wire it is first necessary to deenergize the electro-magnet 12 by opening switch 16, whereupon the pulling action exerted by the armature 20 on pawl 11 will cease and pawl 11 will, under spring action, return into its rest position. The piston rod 51 is pressed back by the spring 57, in which action the spring is aided either by raising the trolley pole 1 or by passing compressed air or liquid into the dashpot 49 whereupon the lever 10 is brought by lever 43 into the rest of pawl 11. It follows from this that as soon as the trolley pole is replaced on the overhead wire, the whole operating device together with the springs are returned automatically to their initial positions.

The modification represented in Figs. 3, 4 and 5 differs only from the embodiment shown in Figs. 1 and 2 in that the operating device and springs are arranged behind the pivot when viewed in the running direction of the car and not in front of it.

The springs 55, 56 act on the section situated below the axis 4 of the trolley pole 1. The opposite ends of these springs are journalled on the pivot 54 arranged on the end of the piston rod 51. The springs 55, 56 hold trolley pole 1 in its operative position and draw pivot 54 towards axis 4. This is prevented by the tooth or toothed wheel 61 journalled on the pivot of lever 43 and engaging with the end 60 of piston rod 51 (Fig. 5). Accordingly, the lever 43 tends to turn in the direction of the arrow indicated on Fig. 3, but this is prevented by lever 10 connected into the rest of pawl 63 subject to spring action. The pawl 63 is deflected against spring action by lever 32, with the cooperation of the levers 11 and 62 operated by the armature 20 of magnet 12.

Notably, as soon as the shoe of the trolley pole 1 has left the overhead wire the magnet 12 will deflect lever 62 on the axle of lever 11 (Fig. 5), whereupon the lever 32 becomes released from lever 62 and the pawl 63 will, in consequence of the pressure of the lever 10, become deflected in a counter-clockwise sense. In the meantime lever 10 jumps out from the rest of pawl 63, and lever 43 will, together with tooth 61 mounted on the common axle, turn in the direction of the arrow shown in Fig. 3 and release piston rod 51. Under the action of the springs 55, 56, the piston 50 will become displaced in the direction of the arrow shown in Fig. 5. This motion is resisted by the counter-spring 57 and by the medium compressed in the dashpot 49.

In other respects the device according to Figs. 3, 4 and 5, is similar to the current-collector releasing and braking device shown in Figs. 1 and 2.

Magnet 12 should preferably be constructed in such a manner as to ensure that lever 11 should exert a striking effect, so that the engagement between levers 32 and 62 is released with greater safety.

What I claim is:

1. A trolley pole associated with a trolley wire comprising a pole section, a contact element carried by said pole section, means biasing said element into contact with the trolley wire, a substantially vertical pivot associated with said pole section to permit rotation thereof in a horizontal plane, a pneumatically operated brake for preventing said rotation, and means responsive to loss of contact between said contact element and the trolley wire for gradually reducing the bias of said biasing means upon said element and causing said biasing means to simultaneously apply said brake.

2. A trolley pole associated with a trolley wire comprising a pole section, a contact element carried by said pole section, a spring biasing said element into contact with the trolley wire, a substantially vertical pivot associated with said pole section to permit rotation thereof in a horizontal plane, a pneumatically operated brake for preventing such rotation, and means responsive to loss of contact between said contact element and the trolley wire for gradually reducing the bias of the spring upon said element and causing said spring to simultaneously apply said brake.

3. A trolley pole associated with a trolley wire comprising a pole section, a contact element carried by said pole section, a frame supporting said pole section, a substantially vertical pivot associated with said frame to permit rotation thereof in a horizontal plane, a pneumatically operated brake for preventing such rotation, a spring connected between said frame and said pole section, means for tensioning said spring in a direction to maintain contact between said contact element and the trolley wire, a piston operatively connected to said spring, a cylinder surrounding said piston, a passage between said cylinder and said brake, and means responsive to loss of contact between said contact element and the trolley wire for releasing said tensioning means to reduce the tension of the spring and cause it to operate said piston to apply said brake.

4. A trolley pole associated with a trolley wire comprising a pole section, a contact element carried by said pole section, a frame supporting said pole section, a substantially vertical pivot associated with said frame to permit rotation thereof in a horizontal plane, a pneumatically operated brake for preventing such rotation, a pivoted link mounted on said frame, a spring connected between said link and said pole section, a mechanism holding said link in position for tensioning said spring in a direction to maintain contact between said contact element and the trolley wire, a piston operatively connected to said link, a cylinder surrounding said piston, a passage between said cylinder and said brake, and means responsive to loss of contact between said contact element and the trolley wire for releasing said holding mechanism to reduce the tension of the spring and cause it to operate said piston to apply said brake.

FERENC SZALAY.